US008667356B2

(12) United States Patent
Wang et al.

(10) Patent No.: US 8,667,356 B2
(45) Date of Patent: Mar. 4, 2014

(54) METHOD FOR TRIGGERING RETRANSMISSION IN A MULTICAST SYSTEM AND APPARATUS IMPLEMENTING THE METHOD

(75) Inventors: Yonggang Wang, Shanghai (CN); Bernd Haberland, Shanghai (CN); Pingping Xing, Shanghai (CN); Bijun Zhang, Shanghai (CN)

(73) Assignee: Alcatel Lucent, Paris (FR)

( * ) Notice: Subject to any disclaimer, the term of this patent is extended or adjusted under 35 U.S.C. 154(b) by 956 days.

(21) Appl. No.: 12/674,287

(22) PCT Filed: Aug. 20, 2007

(86) PCT No.: PCT/CN2007/002504
§ 371 (c)(1),
(2), (4) Date: Feb. 19, 2010

(87) PCT Pub. No.: WO2009/023986
PCT Pub. Date: Feb. 26, 2009

(65) Prior Publication Data
US 2011/0219281 A1   Sep. 8, 2011

(51) Int. Cl.
*H04L 1/18*   (2006.01)
(52) U.S. Cl.
USPC .......................................... 714/748; 714/704
(58) Field of Classification Search
USPC ................................................. 714/748, 704
See application file for complete search history.

(56) References Cited

U.S. PATENT DOCUMENTS 5,727,002 A   3/1998 Miller et al.
6,385,437 B1 * 5/2002 Park et al. ........................ 455/69
6,714,524 B1 * 3/2004 Kim et al. ..................... 370/335
7,746,831 B2 * 6/2010 Chaponniere et al. ........ 370/335
7,898,952 B2 * 3/2011 Kim et al. ..................... 370/232

(Continued)

FOREIGN PATENT DOCUMENTS

CN   1667991 A   9/2005
CN   1667993 A   9/2005

(Continued)

OTHER PUBLICATIONS

International Search Report.

(Continued)

*Primary Examiner* — Esaw Abraham
(74) *Attorney, Agent, or Firm* — Fay Sharpe LLP

(57) ABSTRACT

Disclosed is a method for triggering retransmission in a multicast system, including a base station eNB setting a retransmission condition based on a channel state indication and transmitting the set retransmission condition to a user equipment UE; and the UE comparing the current channel state indication of the UE with the received retransmission condition when receiving an error block, and feeding back a NACK signaling to the eNB trigger a retransmission when the retransmission condition is satisfied. The method according to the present invention is to restrict the trigger of the NACK signaling, by setting the condition of the UE feeding back the NACK signaling when the UE received the error block. Then the feedback signaling on the uplink channel would be restricted, and the retransmission probability would be limited in an appropriate region as in Rel 6 HSDPA, therefore the optimal ratio of efficiency over power would be achieved. Consequently, the number of NACK signaling is restricted so as to avoid the uplink overload. Meanwhile, the retransmission probability is limited so that the optimal ratio of efficiency over power may be achieved.

17 Claims, 3 Drawing Sheets

(56) References Cited

U.S. PATENT DOCUMENTS

| | | | |
|---|---|---|---|
| 8,050,248 B2 * | 11/2011 | Meyer et al. | 370/349 |
| 8,306,061 B2 * | 11/2012 | Lee et al. | 370/473 |
| 2004/0010736 A1 | 1/2004 | Alapuranen | |
| 2005/0138671 A1 | 6/2005 | Love et al. | |
| 2005/0182995 A1 | 8/2005 | Curcio et al. | |

FOREIGN PATENT DOCUMENTS

| | | |
|---|---|---|
| CN | 1669263 A | 9/2005 |
| CN | 1864361 A | 11/2006 |
| WO | WO 2005/071887 A1 | 8/2005 |
| WO | WO2007/021591 A2 | 2/2007 |

OTHER PUBLICATIONS

Rong, Bo, et al., "SDL Modeled Hybrid Error Control Scheme for Reliable Multicast over Internet", Electrical and Computer Engineering, 2004, Canadian Conference on Niagara Falls, Ont., Canada, May 2-5, 2004, Piscataway, NJ, USA, IEEE, US, May 2, 2004, pp. 409-414, vol. 1.

\* cited by examiner

METHOD FOR TRIGGERING RETRANSMISSION IN A MULTICAST SYSTEM AND APPARATUS IMPLEMENTING THE METHOD

FIELD OF THE INVENTION

The present invention relates to a multicast system, and especially, to a method for triggering retransmission in a multicast system and an apparatus using the same.

BACKGROUND OF THE INVENTION

E-MBMS is an evolution of multi-media broadcast and multicast service in 3GPP LIE. MBMS transmissions may be performed in following two ways: Multi-cell transmissions and Single-cell transmissions. The present invention relates to a single-cell transmission mode.

In case of single-cell transmission, i.e. a cell specific to multipoint transmission, a content of multicast service is independent in each cell. The MBMS data from multiple cells need not synchronously be transmitted. In 3GPP LIE specification, an MTCH (MBMS Traffic Channel) will be mapped to a DL-SCH (Downlink Synchronization Channel).

In E-UTRNA, DL-SCH is mainly mapped by a dedicated traffic channel (DTCH). To improve a peak rate of UE unicast traffic and a system throughput, DL-SCH is characterized by using HARQ (High Automatic Repeat Request), adaptive modulation coding and transmit power, dynamic or semi-static resource allocation, CQI reporting and etc.

When the MTCH is mapped to the DL-SCH, this part of the DL-SCH should be broadcasted in the entire cell. To provide a required data rate and BLER (Block Error Ratio) at the edge of cells, similar procedures as used by the unicast traffic for the DL-SCH are envisaged, such as HARQ.

Similar to HSDPA (High Speed Downlink Packet Access), a physical HARQ can decrease the BLER in a receiver so as to achieve higher transmission performance, but a tradeoff is decreasing of transmission efficiency. From the experience of HSDPA deployment, the first transmission's BLER is between 10%~30%, which could achieve an optimal performance-efficiency ratio.

However, when the HARQ is applied in multicast systems, since there are multiple UEs receiving the downlink multicast traffic simultaneously, in principle only one UE received an error block and returned a NACK signaling, a base station (eNB) should retransmit this data block.

From a point view of probability theory, if n UEs are located in one cell, the error probability is $\alpha$ for all the UEs in a first transmission, then the probability that at least one UE received the error block is $1-(1-\alpha)^n$. If the number of the UEs is large, this probability would be very high. Therefore some mechanisms should be applied to restrict the feedback of the NACK signaling, or to trigger the retransmission of data blocks.

A target is to firstly restrict that the UE whose BLER is less than 30% may feed back the NACK, secondly to limit the probability of retransmission in eNB, for example 50%. In addition, if the UE feeds back too much NACK, the uplink would be overload. Thus it should restrict the number of NACK signaling upon the UEs receive the error block.

The present invention relates to applying HARQ in a method for triggering a retransmission in a multicast system, which is independent to the way of the UE feeding back the NACK signaling and the way of eNB retransmitting.

SUMMARY OF THE INVENTION

According to an aspect of the present invention, a method for triggering retransmission in a multicast system is provided, which comprises the following steps of: a base station eNB setting a retransmission condition based on a channel state indication, and transmitting the set retransmission condition to a user equipment UE; and the UE comparing the current channel state indication of the UE with the received retransmission condition when receiving an error block. The UE feeds back a NACK signaling to the eNB to trigger a retransmission, when the retransmission condition is satisfied.

According to another aspect of the present invention, a retransmission trigger system is provided, comprising: retransmission condition setting means at a base station eNB, which is adapted to set a retransmission condition based on a channel state indication and to transmit the set retransmission condition to a user equipment UE; and retransmission comparing means at the UE, which is adapted to compare the current channel state indication of the UE with the received retransmission condition when the UE receives an error block. The UE feeds back a NACK signaling to the eNB to trigger a retransmission when the retransmission condition is satisfied.

The method according to the present invention is to restrict the trigger of NACK signaling, by setting the condition of UE feeding back the NACK signaling when UE received the error block. Then the feedback signaling on the uplink channel would be restricted, and the retransmission probability would be limited in an appropriate region as in Rel 6 HSDPA. Therefore the optimal ratio of efficiency over power would be achieved. Consequently, the number of NACK signaling is restricted so as to avoid the uplink overload. Moreover, the retransmission probability is limited so that the optimal ratio of efficiency over power is achieved.

DETAILED DESCRIPTION OF THE PREFERRED EMBODIMENTS

Figure 1:
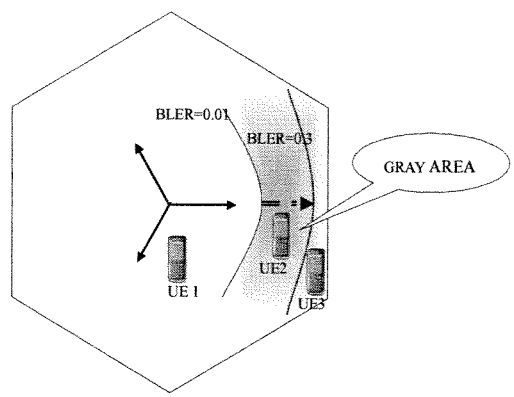
FIG. 1 is a schematic diagram of illustrating the present invention with BLER as an example.

For E-MBMS, the target is either to extend the cell edge or increase the throughput. For HARQ, the main point lies in extending the cell edge and further providing transmission performances satisfying the BLER requirement in the cell edge. In FIG. 1, when there is no HARQ, the cell edge is a solid curve at BLER of 0.01, where the coverage is 70% as example. And on the border of coverage with 90%, the BLER is only 0.3. The target of HARQ is to extend the cell edge from 70% to 90% or decrease the BLER at 90% cell edge from 0.3 to 0.01.

When a retransmission was applied if anyone of UEs reception in the cell is wrong, it would induce 100% retransmission on the assumption that the tens of subscribed UEs were in the cell. The idea retransmission probability is less than 30% in Rel 6 HSDPA to achieve the optimal ratio of efficiency over power. The approaches which take the eNB to trigger the retransmission conditionally will be illuminated in the following.

Figure 4:
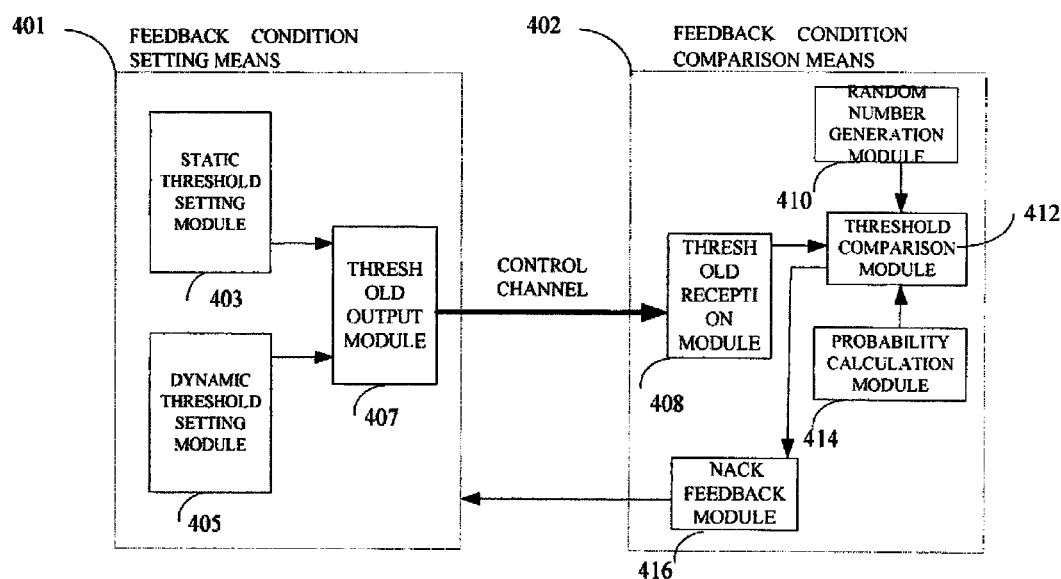
FIG. 4 is a schematic diagram of a retransmission trigger system according to the present invention.

FIG. 4 is a block diagram of a retransmission trigger apparatus according to the present invention. As shown in FIG. 4, a retransmission trigger system 400 according to the present invention comprises: feedback condition setting means 401 at an eNB and feedback condition comparison means 402 at a UE. The feedback condition setting means 401 comprises a static threshold setting module 403, a dynamic threshold setting module 405 and an output module 407. The output module 407 transmits thresholds generated by the static threshold setting module 403 and the dynamic threshold setting module 405 to a reception module 408 of the feedback condition comparison means 402 over a control channel. The dynamic threshold setting module 405 is optional in the static threshold scheme. The feedback condition comparison means 402 further comprises a random number generation module 410, a threshold comparison module 412, a probability calculation module 414 and a NACK feedback module 416. When the UE receives an error block, the threshold comparison module 412 compares received thresholds with the current instantaneous channel state parameter of the UE so as to determine whether to feed back a NACK signaling to the eNB, thereby facilitating triggering a retransmission or not.

In the following, the retransmission trigger method according to the present invention will be described in detail by referring to FIGS. 1-4.

Firstly, at step 301, a condition of the UE feeding back the NACK signaling when the UE receives the error block is set. The condition may be two thresholds, threshold A and threshold B. The definition of the thresholds may be:
1) Bit Error Ratio (BER) in a physical layer, or
2) Block Error Ratio (BLER) in layer 2.

Figure 2:
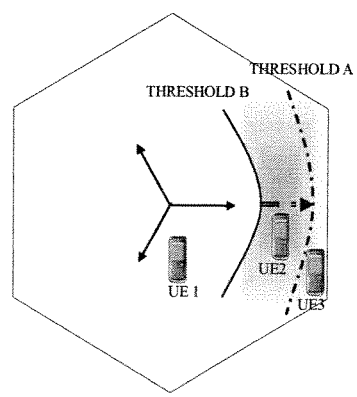
FIG. 2 is a schematic diagram of explaining a definition of threshold according to the present invention.
Figure 3:
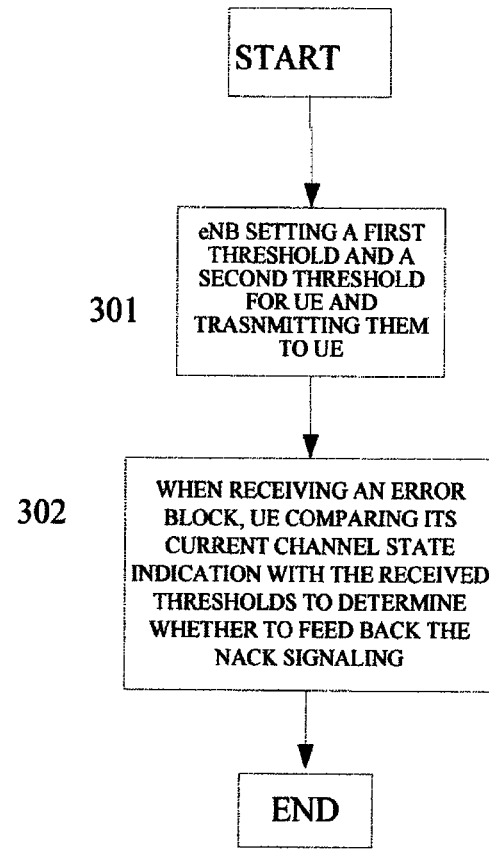
FIG. 3 is a flowchart of a retransmission trigger method according to the present invention.

Here the threshold A and threshold B may be configured by the eNB. As shown in FIG. 2, for example, the actual meanings of threshold A and threshold B may correspond to the border of coverage in cell. Alternatively, the thresholds may be set using other channel state indications, such as SNR and the like.

On the assumption that a measured or statistical value is X, X may be BER or BLER in different cases. Then the detailed step is as follows:
when the UE receives an error block, and X is defined as the BER or BLER, wherein
if X>A, then UE does not feed back the NACK signaling;
if X<B, then UE does not feed back the NACK signaling; and
If X<=A and X>=B, then it is possible for the UE to feed back the NACK signaling.

Therefore, as shown in FIG. 2, the UEs far from the eNB, which are located outside threshold A (e.g. UE3) need not feed back the NACK signaling. On the assumption that in the identical channel condition, even if there is a retransmission, the probability of correctly receiving the previous blocks is very low. The UEs near the eNB, which are located inside threshold A (e.g. UE1) also need not feedback the NACK signaling since it has satisfied the BLER requirement (less than 1%). Only the UEs located between threshold A and threshold B (e.g. UE2) shall feed back the NACK signaling, since HARQ could correct the error blocks received by UE in this region.

How to choose the threshold and how to implement the method according to the present invention will be explained in the following with BLER an example.

On the assumption that there are n UEs in the cell to receive the multicast service, and the instantaneous BLERs are $\alpha_1, \alpha_2, \ldots, \alpha_n$, then during one packet transmission, the probability that at least one UE received error block is:

$$P = 1 - \prod_{i=1}^{n} (1 - \alpha_i)$$

In general, $\alpha_1 \leq \alpha_2 \leq \ldots \alpha_n$.

If the number of uplinks (slots) that may be simultaneously used in the UE feeding back in RRC CONNECTION, which can be accepted by the eNB, is m, then the following condition shall be satisfied:

$$\sum_{i=1}^{n} \alpha_i \leq m$$

Therefore, the condition of the UE feeding back the NACK signaling when UE receives the error block may be set so as to:
1) limit the retransmission probability less than 50%,
2) restrict the UE less than 30% feeding back the NACK, and
3) restrict the number of simultaneous NACK signaling.

That is, the conditions and thresholds shall be set as:

$$\begin{cases} 1 - \prod_{i=j}^{k} (1 - \alpha_i) \leq 0.5 \\ Th\_A = \alpha_k \leq 0.3 \\ Th\_B = \alpha_j \geq 0.05 \\ \sum_{i=j}^{k} \alpha_i \leq m \end{cases}$$

wherein $j \leq i \leq k$.

At step 302, UEs satisfying the above conditions may feed back NACK signaling when receiving the error block. Here, we extend the lower bound from 0.1 to 0.05, and the effective UEs which may feed back the NACK signaling is in this region of 0.05~0.3. The 50% and 30% retransmission probabilities are not the rigorous values, which may depend on the actual service performance requirement and radio resource provided.

Based on the above conditions, two approaches are proposed in the present invention to achieve the above targets.
Approach 1: static thresholds, but a dynamic feedback probability factor for UE receiver is ρ;
Approach 2: dynamic thresholds, but the eNB shall know each UE's instantaneous BLER and set the thresholds.

As to Approach 1, the eNB sets the static thresholds as Th_A=0.3 and Th_B=0.05, respectively, and transmits them to the UE over a control channel. For UE feeding back the NACK signaling, a probability factor ρ is set. Once the UE detects the error block, it will feed back the NACK signaling responding to the HARQ based on the probability factor. The value of the probability factor may be varied related to UE measurement or BLER. For example, if the UE is near the eNB, the measured BLER would be small, then a high probability factor ρ is set by a probability calculation module 414. If the UE is far from the eNB, the measured BLER would be large, then a low probability factor ρ is set. The detailed step is as follows:

When the UE receives an error block, and the UE's instantaneous BLER is bigger than Th_A or smaller than Th_B, then the UE does not feed back the NACK signaling. When the UE's instantaneous BLER is between Th_A and Th_B, a random generation module 410 may generate a random numeral x between 0 and 1, wherein:
if x<ρ, then the UE does not feedback an NACK signaling;
if x>ρ, then the UE feeds back the NACK signaling by a NACK feedback module 416.

How to Choose the Probability Factor ρ:

Generally, this approach is applied in the scenario where much more UEs exist in a cell. To avoid the overload of the uplink due to the feedback, even a UE detects an error block, it shall attempt to feed back a NACK signaling respond to the HARQ based on the probability factor. On the assumption that the probability of the UE feeding back the NACK signaling is $\rho_i$, then the probability of the eNB at least receiving one NACK is $$P = 1 - \prod_{i=1}^{n}(1 - \alpha_i \rho_i)$$

If the number of uplinks (slots) that may be simultaneously used in the UE feeding back in RRC CONNECTION, which can be accepted by the eNB, is m, then the following condition shall be satisfied:

$$\sum_{i=1}^{n} \alpha_i \rho_i = m$$

Considering the retransmission probability, P is expected to be the minimal value. Based on the Cauchy inequality, only if $\alpha_1\rho_1 = \alpha_2\rho_2 = \ldots = \alpha_n\rho_n$, the minimum value can be obtained for P.

By the restriction of $\rho_i \leq 1$, the feedback probability factor ρ shall be $$\rho_i = \begin{cases} \frac{m}{\alpha_i \cdot n}, & \alpha_i > \frac{m}{n} \\ 1, & \alpha_i \leq \frac{m}{n} \end{cases}$$

But there is a problem, that is both the UE and the eNB do not know the total number of the UEs in the cell that actually receive the multicast service, i.e. n.

In order to solve such a problem, a method of an adaptive gradual choice of ρ value is proposed.

(1) At the beginning of a service transmission, the UE sets an initial value κ, for example $\kappa_0 = \kappa_{init} = 0.05$.
(2) Once the $i^{th}$ UE receives κ, it calculates its appropriate $\rho_i$ according to the below equality by a probability calculation module 414:

$$\rho_i = \begin{cases} \frac{\kappa}{\alpha_i}, & \alpha_i > \kappa \\ 1, & \alpha_i \leq \kappa \end{cases}$$

wherein $\alpha_i$ the current BLER measured by the UE. Therefore, when the UE receives an error block, it generates a random number x between 0 and 1, wherein:
if x<$\rho_i$, then the UE does not feed back the NACK signaling; and
if x>$\rho_i$, then the UE feeds back the NACK signaling.

(3) During a preconfigured duration, the UE takes statistic of the total retransmission packets, then adjusts the κ:

$$\kappa_{j+1} = \begin{cases} \lambda \kappa_j & \frac{d_{error}}{D} < 0.5 \\ 1, & \text{if } \lambda \kappa_j > 1 \end{cases}$$

$$\kappa_{j+1} = \frac{1}{\lambda} \cdot \kappa_j, \quad \text{others}$$

where D is the number of packets transmitted in the duration, $d_{error}$ is data of the total retransmission packets in this duration, and λ is a regulation coefficient, λ>1.

(4) The UE performs the operation as the step (2).

Another simplest approach for solving the above problem is to adopt a fixed ρ, for example ρ=0.3.

Approach 2

A threshold setting module 405 of the eNB sets dynamic thresholds as Th_A and Th_B, respectively, and transmits them to the UE over a control channel.

Since the eNB shall know each UE's instantaneous BLER, in this approach, the UE not only feeds back an NACK signaling, but also feeds back the BLER simultaneously in the uplink. The dynamic threshold scheme according to the present invention is proposed as:

(1) The eNB sets initial thresholds as Th_A=0.3 and Th_B=0.05, respectively, and transmits them to the UE over the control channel.
(2) When the UE receives an error block, and the UE's instantaneous BLER is bigger than Th_A or smaller than Th_B, the UE does not feed back NACK signaling. When the UE's instantaneous BLER is between Th_A and Th_B, the UE feeds back the NACK signaling in the following format:

| UE_id | NACK | BLER |
| --- | --- | --- |

(3) During a preconfigured duration, the eNB takes statistic values $\alpha_1, \alpha_2, \ldots, \alpha_l$ of all the BLER feedbacks from the UE, and then adjust the Th_A and Th_B based on below equality, $$\sum_{i=j}^{k} \alpha_i \leq m, \quad \alpha_j \leq \alpha_{j+1} \leq \ldots \leq \alpha_k$$

If $\sum_{i=1}^{l} \alpha_i \geq m$, then $$\begin{cases} \text{Th\_A}_{new} = \alpha_k, & \alpha_k = \alpha_l \\ \text{Th\_B}_{new} = \alpha_j, & \sum_{i=j}^{l} \alpha_i \leq m \end{cases}$$

If $\sum_{i=1}^{l} \alpha_i < m$, then $$\begin{cases} \text{Th\_A}_{new} = \lambda \alpha_k, & \alpha_k = \alpha_l \\ \text{Th\_B}_{new} = \alpha_j, & \alpha_j = \alpha_1 \end{cases}$$

wherein λ is a regulation coefficient, and λ>1;
(4) Dynamic threshold could not restrict the probability of the eNB's retransmission. A retransmission probability factor q in the eNB may be set accordingly, for example q=50%. The eNB may attempt to retransmit an error transmission block based on the probability factor.

When an eNB receives a NACK signaling, it generates a random number x between 0 and 1, wherein:
if x<q, then the eNB retransmits the error transmission block; and
if x>q, then the eNB does not retransmit the error transmission block.

The present invention proposes a method for triggering NACK and performing retransmission in a multicast system for HARQ. Since HARQ is introduced in the multicast system and the condition retransmission mechanism is used, higher transmission performance and efficiency may be achieved.

The present invention may restrict the trigger of NACK signaling by setting the condition of the UE feeding back the NACK signaling when the UE receives the error block. Then the feedback signaling on the uplink channel would be restricted, and the retransmission probability would be limited in an appropriate region as in Rel 6 HSDPA, therefore the optimal ratio of efficiency over power would be achieved. Consequently, the uplink overload may be avoided, since the number of NACK signaling is restricted. Moreover, the optimal ratio of efficiency over power may be achieved since the retransmission probability is limited.

What is claimed is:

1. A method for triggering retransmission in a multicast system, the method comprising:
   a user equipment (UE) receiving from a base station a retransmission condition based at least on a channel state indication; and
   the UE comparing the current channel state indication of the UE with the received retransmission condition when receiving an error block, and feeding back a negative acknowledgment (NACK) signaling to the base station to trigger a retransmission when the retransmission condition is satisfied.

2. The method according to claim 1, wherein the retransmission condition includes a first threshold and a second threshold higher than the first threshold, and wherein the UE does not feed back the NACK signaling to the base station when the current channel state indication of the UE is smaller than or equal to the second threshold.

3. The method according to claim 1, wherein the retransmission condition includes a first threshold and a second threshold higher than the first threshold, and wherein when the current channel state indication of the UE is between the first threshold and the second threshold,
   if the number of UEs that receive multicast services in the cell is known, the UE determines whether to feed back the NACK signaling based at least on the number of UEs that actually receive multicast services in a cell, the maximum number of uplinks simultaneously established to feed back the NACK signaling, and the current channel state indication of the UE; and
   if the number of the UEs that receive multicast services in the cell is unknown, the UE determines whether to feed back the NACK signaling based on the total statistical number of retransmission packets and the current channel state indication of the UE.

4. The method according to claim 3, further comprising the UE obtaining a probability value based at least on the number of the UEs that receive multicast services in the cell or the statistic total number of retransmission packets, the maximum number of uplinks simultaneously established that are used to feed back the NACK signaling, and the current channel state indication of the UE to generate a random number between 0 and 1, and comparing the generated random number with the probability value, wherein the UE feeds back the NACK signaling to the base station to trigger a retransmission of the base station if the random number is bigger than the probability value, otherwise the UE does not feed back the NACK signaling.

5. A method for triggering retransmission in a multicast system, the method comprising:
   a base station setting a retransmission condition based at least on a channel state indication and transmitting the set retransmission condition to a user equipment (UE); and
   receiving a negative acknowledgment (NACK) signaling from the UE to trigger a retransmission when the retransmission condition is satisfied, wherein the base station determines whether to retransmit an error transmission block based on a preset probability factor when receiving the NACK signaling.

6. The method according to claim 5, wherein the base station generates a random number between 0 and 1, and wherein the base station does not retransmit the error transmission block when the preset retransmission probability factor is bigger than the random number, otherwise the base station retransmits the error transmission block to the UE.

7. The method according to claim 5, wherein the channel state indication includes Bit Error Ratio (BER), Block Error Ratio (BLER) or Signal-to-Noise Ratio (SNR).

8. The method according to claim 5, wherein the base station transmits the retransmission condition to the UE over the control channel.

9. A retransmission trigger system, comprising: a receiver at a user equipment (UE) configured to receive from a base station a retransmission condition based on a channel state indication; and
   a retransmission comparison module at the UE, configured to compare the current channel state indication of the UE with the received retransmission condition when receiving an error block, the UE feeding back a negative acknowledgment (NACK) signaling to the base station to trigger a retransmission when the retransmission condition is satisfied.

10. The system according to claim 9, wherein the retransmission condition includes a first threshold and a second threshold higher than the first threshold, and wherein the UE does not feed back the NACK signaling to the base station when the current channel state indication of the UE is smaller than or equal to the second threshold.

11. The system according to claim 9, wherein the retransmission condition includes a first threshold and a second threshold higher than the first threshold, and wherein when the current channel state indication of the UE is between the first threshold and the second threshold,
   if the number of UEs that actually receive multicast services in the cell are known, the UE determines whether to feed back the NACK signaling based at least on the number of UEs that actually receive multicast services in a cell, the maximum number of uplinks simultaneously established to feed back the NACK signaling, and the current channel state indication of the UE; and
   if the number of the UEs that receive multicast services in the cell are unknown, the UE determines whether to feed back the NACK signaling based on the total statistical number of retransmission packets and the current channel state indication of the UE.

12. The system according to claim 11, wherein the UE is configured to obtain a probability value based at least on the number of the UEs that receive multicast services in the cell or the statistic total number of retransmission packets, the maximum number of uplinks simultaneously established that are used to feed back the NACK signaling, and the current channel state indication of the UE to generate a random number between 0 and 1, and compare the generated random number with the probability value, wherein the UE is further configured to feed back the NACK signaling to the base station to trigger a retransmission of the base station if the random number is bigger than the probability value, otherwise the UE does not feed back the NACK signaling.

13. The system according to claim 9, wherein the retransmission condition includes a first threshold and a second threshold higher than the first threshold, and wherein the UE is configured to:
   feed back the NACK signaling to the base station to inform the base station of the current channel state indication of the UE, when the current channel state indication of the UE is between the first threshold and the second threshold;
   update the first threshold and the second threshold based on the received NACK signaling and the channel state indication and transmits the updated thresholds to the UE; and
   determine whether to transmit the NACK signaling based on the updated thresholds.

14. The system according to claim 9, wherein the channel state indication includes Bit Error Ratio (BER), Block Error Ratio (BLER) or Signal-to-Noise Ratio (SNR).

15. The system according to claim 9, wherein the UE receives the retransmission condition from the base station over the control channel.

16. A method for triggering retransmission in a multicast system, the method comprising:
   a user equipment (UE) receiving from a base station a retransmission condition based on a channel state indication; and
   the UE comparing the current channel state indication of the UE with the received retransmission condition when receiving an error block, and feeding back a negative acknowledgment (NACK) signaling to the base station to trigger a retransmission when the retransmission condition is satisfied, wherein the retransmission condition includes a first threshold and a second threshold higher than the first threshold;
   the UE feeding back the NACK signaling to the base station to inform the base station of the current channel state indication of the UE, when the current channel state indication of the UE is between the first threshold and the second threshold;
   the UE updating the first threshold and the second threshold based on the received NACK signaling and the channel state indication and transmits the updated thresholds to the UE; and
   the UE determining whether to transmit the NACK signaling based at least on the updated thresholds.

17. A retransmission trigger system, the system comprising:
   a receiver at a user equipment (UE) configured to receive from a base station a retransmission condition based at least on a channel state indication; and
   a retransmission comparison module at the UE, configured to compare the current channel state indication of the UE with the received retransmission condition when receiving an error block, the UE feeding back a negative acknowledgment (NACK) signaling to the base station to trigger a retransmission when the retransmission condition is satisfied, wherein the retransmission condition includes a first threshold and a second threshold higher than the first threshold, and wherein the UE is configured to: feed back the NACK signaling to the base station to inform the base station of the current channel state indication of the UE, when the current channel state indication of the UE is between the first threshold and the second threshold;
   update the first threshold and the second threshold based on the received NACK signaling and the channel state indication and transmits the updated thresholds to the UE; and
   determine whether to transmit the NACK signaling based on the updated thresholds.

\* \* \* \* \*